(12) United States Patent
Ryu et al.

(10) Patent No.: US 6,309,694 B1
(45) Date of Patent: Oct. 30, 2001

(54) METHOD FOR MANUFACTURING A CONDUCTIVE POLYMER FILM

(75) Inventors: Kwang Sun Ryu; Kwang Man Kim; Seong-Gu Kang; Soon Ho Chang, all of Taejon (KR)

(73) Assignee: Electronics and telecommunications Research Institute, Taejon (KR)

( * ) Notice: Subject to any disclaimer, the term of this patent is extended or adjusted under 35 U.S.C. 154(b) by 0 days.

(21) Appl. No.: 09/498,037

(22) Filed: Feb. 4, 2000

(30) Foreign Application Priority Data

Dec. 16, 1999 (KR) .................................................. 99-58382

(51) Int. Cl.⁷ ...................................................... B05D 3/02
(52) U.S. Cl. .......................................... 427/58; 427/385.5
(58) Field of Search ..................... 427/58, 385.5

(56) References Cited

U.S. PATENT DOCUMENTS

| | | | |
|---|---|---|---|
| 4,711,742 | * 12/1987 | Jen et al. | 252/500 |
| 5,002,700 | 3/1991 | Otagawa et al. | 252/500 |
| 5,162,135 | 11/1992 | Gregory et al. | 427/121 |
| 5,250,388 | 10/1993 | Schoch, Jr. et al. | 430/269 |
| 5,736,623 | * 4/1998 | Angelopoulos et al. | 252/500 |
| 5,849,045 | 12/1998 | Chen et al. | 29/623.5 |

OTHER PUBLICATIONS

Michaelson et al, Synth. Met. 55 (2–3), pp 1564–1569, 1993.*

Chen et al, Adv. Mater. (Weinheim, Ger.), 7(5), pp 473–475, 1995.*

Gu et al, Gongneng Cailiao, 27(2), pp 135–138, 1996.*

MacDiarmid et al., "Towards Optimization of Electrical and Mechanical Properties of Polyaniline: Is Crosslinking between Chains the Key?" *Synthetic Metals*, pp. 753–760, 1993.

Chen, et al., "Polyanaline Doped by the New Class of Dopant, Ionic Salt: Structure and Properties," *Macromolecules*, 28(4):1239–1245, 1995.

MacDiarmid et al. "Secondary Doping in Polyaniline," *Synthetic Metals*, 69:85–92, 1995.

Angelopouloa et al., "LiCl Induced Morphological Changes in Polyaniline Base and Their Effect on the Electronic Properties of the Doped Form," *Macromolecules* 29(8) : 3046–3049, 1996.

\* cited by examiner

*Primary Examiner*—Erma Cameron
(74) *Attorney, Agent, or Firm*—Sed IP Law Group, PLLC

(57) ABSTRACT

A method of manufacturing a conducting polymer film including dissolving a lithium salt in an organic solvent; after the lithium salt is completely dissolved in the organic solvent, dissolving a conducting polymer in the organic solvent by adding the conducting polymer little by little in many separate doses into the organic solvent until obtaining a deep blue colored solution; and leaving the deep blue colored solution as it stands over seven days and coating it on a flat surface; and evaporating the solvent from the coated solution. It is possible to work the conducting polymer film in a very thin membrane and to control the thickness as required, since the polymer film can be formed directly from a solution. Furthermore, it is also possible to control the conductivity of the polymer film by varying the type of salts as used and the concentration thereof, and thus its applicability is very diverse as the purpose of using them, for example in electronic/electric components.

10 Claims, 5 Drawing Sheets

METHOD FOR MANUFACTURING A CONDUCTIVE POLYMER FILM

TECHNICAL FIELD

The present invention relates to a method of manufacturing a conductive polymer film, and in particular, to a method for forming, a conductive polymer film directly from a solution.

BACKGROUND OF THE INVENTION

Recently, a great deal of research has been made for conducting polymers. These polymers have both metallic and polymeric properties and thus have electric conductivity. Due to this advantageous characteristic of conducting polymers, their utilities are very wide and have an indefinite potential for application in various industrial fields.

In electronic/electric component fields, conducting polymers have been applied to an electrolytic capacitor, an electric dual layer condenser, a switching device, a non-linear device, a field effect transistor, a photo-recording material, a display device, an anisotropic conducting sensor and other components, and research is continuously performed for further application of those conducting polymers.

In order for a polymer to show electric conductivity, it should undergo a doping process. Various doping processes can be used for doping on a polymer. In particular, protonic acid doping phenomena were first observed from polyacetylene, and thereafter it has been found that if an organic compound containing different species of elements, such as polyaniline, polypyrrole and etc., was treated with a protonic acid, their electric and magnetic properties would be significantly changed.

Among various conducting polymers, protonic acid doping for polyaniline, which is stable in the air and can be easily produced, has been widely researched. The conductivity of polyaniline synthesized chemically or electrochemically may be also changed by its pH. It may show a very wide range of conductivity values with respect to the pH, such as about 5 S/cm for pH=−1~+1, while about $10^{-10}$ S/cm for pH=5~6.

Since such a conducting polymer is hardly dissolved in a solvent after protonic acid doping, many problems are raised in treating or applying it.

Recently, it has been found that conducting polymer films can be formed from an organic acid doped polyaniline solution, and they show the conductivity of about 100 to 400 S/cm.

However, because those films may be formed from various organic acids, they are very brittle and the effect of aging on their electric conductivity is very severe. Indeed, since organic acids and solvents used in forming those films do not have an environmental affinity, many problems occur in treating or in using them.

According to a conventional method of a conducting polymer, a polymer is prepared in non-conducting powder or film form and then chemically treated in a certain manner to show conductivity.

Conducting polymers produced in this way will exhibit different conductivities in terms of chemical agents used in producing them, in concentrations thereof, and in treating processes employed. However, once they have an electrically conducting property, their workability rapidly deteriorates, thereby making it impossible to use them in a desired purpose or shape.

SUMMARY OF THE INVENTION

In order to solve the above problems, the disclosed embodiments of the present invention provide a method for manufacturing a conducting polymer film, by dissolving a dopant in a solution containing a dopant already dissolved therein, and then forming a conducting polymer film from the solution, whereby the resultant conducting polymer has excellent workability, so that the electronic/electric components using the conducting polymer film can be suitably fitted for the purpose of using them in various fields.

In order to achieve the foregoing, the embodiments of the present invention provide a method for manufacturing a conducting polymer comprising the steps of: solving a lithium salt in an organic solvent; after the lithium salt is completely dissolved in the organic solvent, solving a conducting polymer in the organic solvent while adding the conducting polymer little by little in many separate doses into the organic solvent until obtaining a deep blue colored solution; leaving the deep blue colored solution as it stands over seven days and coating it on a flat surface; and evaporating the solvent from the coated solution.

According to another aspect of the present invention, the organic solvent preferably consists of a polarized matter that can dissolve both a lithium salt and a conducting polymer.

In particular, it is preferable that the organic solvent consists of N-methyl-2-pyrrolidinone (NMP).

In order to achieve the foregoing more effectively, the concentration of lithium salt dissolved in the step of dissolving salt is 0.3 to 0.01 moles.

Furthermore, the lithium salt may be selected from the group consisting of $LiClO_4$, $LiPF_6$, $LiBF_6$, $LiAsF_6$, $LiCF_3SO_3$, $LiN(CF_3SO_2)_2$, $LiC(CF_3SO_2)_3$ and a combination thereof.

According to a further aspect of the present invention, it is preferred that the lithium salt be completely dissolved in the step of dissolving lithium salt by stirring the lithium salt using a magnetic stirrer within a drying box for about one hour.

Also, the conducting polymer used in the above method may be selected from the group consisting of polyaniline, polypyrrole, polythiophene, derivatives of these polymers, and a combination thereof.

In the above method, the step of dissolving a conducting polymer may consist of adding and dissolving the polymer in many separated doses, each of which is 1 to 10 wt %, preferably about 3 wt %, over 1.5 hours and then stirring it for 3 hours using a magnetic stirrer.

The above method may further comprise a step of filtering a deep blue colored solution obtained in the step of dissolving a conducting polymer using a filter paper to remove residually undissolved polymer particles before the step of leaving the deep blue colored solution as it stands.

In the evaporating step, the solvent of the solution coated on the flat surface at a certain thickness is evaporated at the temperature of about 80° C. raised by solution evaporation-drying method or spin coating method for 3 to 4 hours.

The method according to the present invention may further comprise a step of dual doping a protonic acid on the conducting polymer to improve conductivity. It is preferred that the protonic acid is HCl.

According to another aspect of the present invention, there is provided a method for manufacturing a conducting polymer film showing different conductivities at its opposite surfaces, comprising the steps of: solving a lithium salt in a organic solvent, adding and dissolving conducting polymer little by little in many separate doses in the organic solvent containing the dissolved lithium until obtaining deep blue colored solution; coating the obtained deep blue colored solution on a flat surface to obtain the film with a desired thickness; and raising the temperature of the flat surface to 70° C. and continuously heating it for 10 to 15 hours, thereby obtaining a conducting polymer film having different conductivities at its opposite surface.

In the polymer film obtained from this method, the surface in contact with the flat surface is more conductive than the other surface exposed in the air.

BRIEF DESCRIPTION OF THE DRAWINGS

The features and advantages as explained above will be more fully understood by a skilled person in the art from the embodiments described below with reference to the accompanying drawings, wherein.

DETAILED DESCRIPTION OF THE INVENTION

Figure 1:
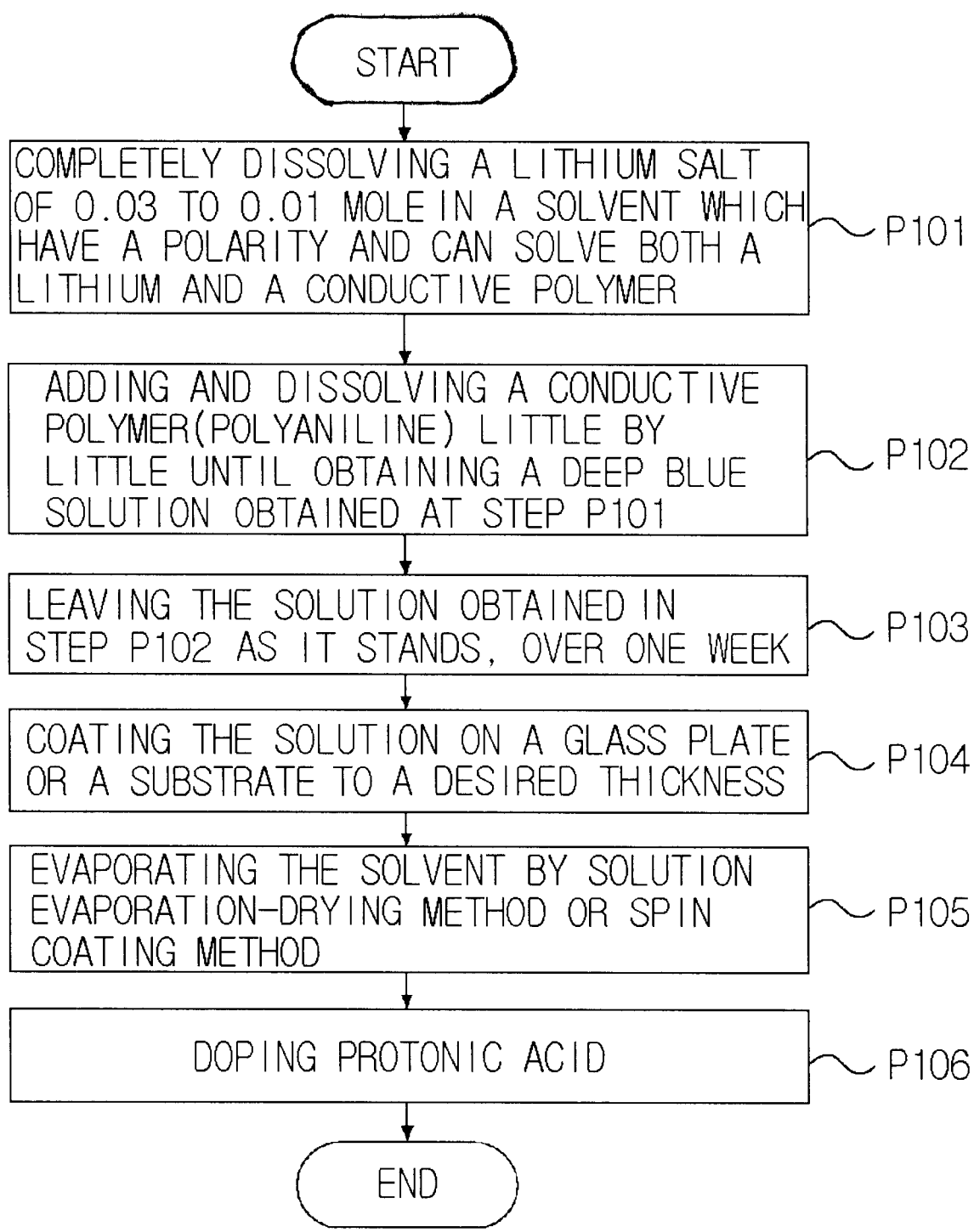
FIG. 1 is a flow chart showing a sequence of manufacturing an electric conducting polymer film formed directly from a polymer solution according to the present invention.

FIG. 1 is a flow chart showing a sequence for manufacturing a conducting polymer film directly from a polymer solution according to an embodiment of the present invention.

At first, in the step P101, a lithium salt of 0.3 to 0.01 moles is completely dissolved in an organic solvent which can dissolve both of lithium salt and polymer and has a polarity. In this case, a preferred organic solvent is N-methyl-2-pyrrolidinone (NMP), in which the lithium salt of 0.3 to 0.01 moles is completely dissolved in the organic solvent by stirring it with a magnetic stirrer within a dry box for about one hour.

Next, conducting polymer such as polyaniline is added into the solution obtained from step P101 little by little in many separate doses, so that it can be easily dissolved, whereby a deep blue colored solution is obtained. Since the concentration of the lithium salt influences significantly to the electrical conductivity of the polymer film, it is needed to control carefully the concentration of the lithium salt, preferably within a range 0.3 to 0.01 mole to be adequate to the electric conductivity required.

The lithium salt can be selected from the group consisting of $LiClO_4$, $LiPF_6$, $LiBF_4$, $LiAsF_6$, $LiCF_3SO_3$, $LiN(CF_3SO_2)_2$ and $LiC(CF_3SO_2)_3$ and a combination thereof. Electrically conducting polymer, especially polyaniline is added and dissolved little by little in many separate doses, each of which is about 1 to 10 wt %, preferably about 3 wt % (mass percentage of polyaniline/NMP) over 1.5 hours and then stirred by a magnetic stirrer for 3 hours to obtain a deep blue solution. Polypyrrole, polythiophene, their derivatives and combination thereof can also be used, besides polyaniline.

The solution obtained through the above steps is filtered by a filter paper and residual polymer particles are removed.

Next, the solution obtained from the step P102 is left as it stands at the step P103 over seven days or more and a predetermined quantity of the solution is poured onto a glass or a substrate to coat the glass or the substrate to give the film with a desired thickness at the step P104.

Next, the solution which has a desired thickness through the step P104 is dried at the step P105. In the drying method employed at the step P105, the solvent is evaporated at the temperature of about 80° C. raised by a solution evaporation-drying method or a spin coating method for 3 to 4 hours.

The resultant polymer formed by heating the coated solution until the solvent is completely evaporated exhibits the conductivity without performing any further separate doping process.

If the polymer film produced through the step P105 does not meet with a certain requirement or if a polymer film needs to be modified or fitted for a particular option, e.g., to enhance the conductivity, it is possible to proceed with the step P106 and to perform a dual doping of protonic acid on the polymer film.

Figure 2:
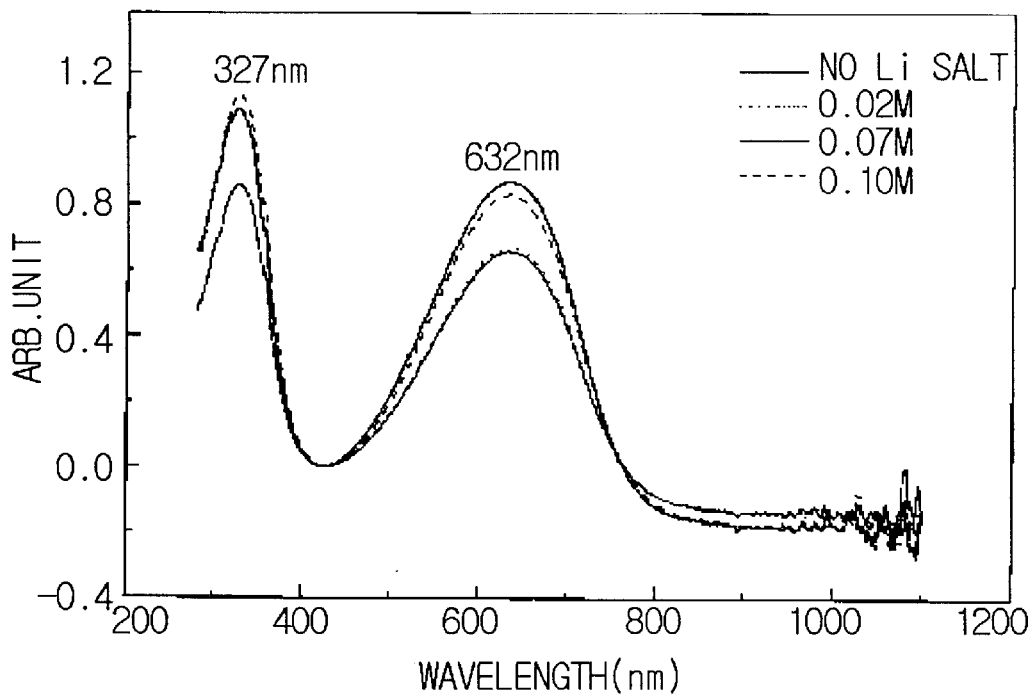
FIG. 2 is a graph showing UV-Vis spectroscopic results for a solution containing both of a lithium salt and a polymer used in the embodiments of the present invention.

FIG. 2 shows UV-Vis spectroscopic results of a solution-containing lithium salt and a polymer dissolved therein and used in the embodiments of the present invention.

Generally, when polyaniline is dissolved in NMP solvent, the solution becomes blue. If this polymer solution is chemically treated (e.g. with a protonic acid such as HCl), a large percentage of the polyaniline dissolved in the solution is separated as a precipitate (deep green) in the state doped by chemical treatment.

The precipitate is commonly insoluble in any solvents, and its workability will be very restricted.

Especially, when an acid treatment is performed to the solution, it is possible to observe that the color of the doped polymer changes. This change in color is decided by a band gap between LUMO and HOMO of π-orbital molecules. The band gap is varied if doped and thus the color changes.

According to the embodiments of the present invention, however, the solution is formed by dissolving a salt in a solvent, so that doping can be occurred by the salt, and then dissolving polyaniline in the solvent.

The color of the solution is deep blue, which is the same as that in the undoped state, and no precipitate is produced. Thus, it can be seen that the doping is not occurred on polymer chains in the solution state.

If UV-Vis spectroscopic measurements are performed in order to observe color changes from the solution state before forming a film to the other state produced by the band gap between LUMO and HOMO, it can be found that the resultant state is the same as the case where only a polymer is dissolved in a solvent without adding a lithium salt, as shown in FIG. 2. From this, it can be concluded again that the doping is not occurred in the polymer chains in the solution state.

Figure 3:
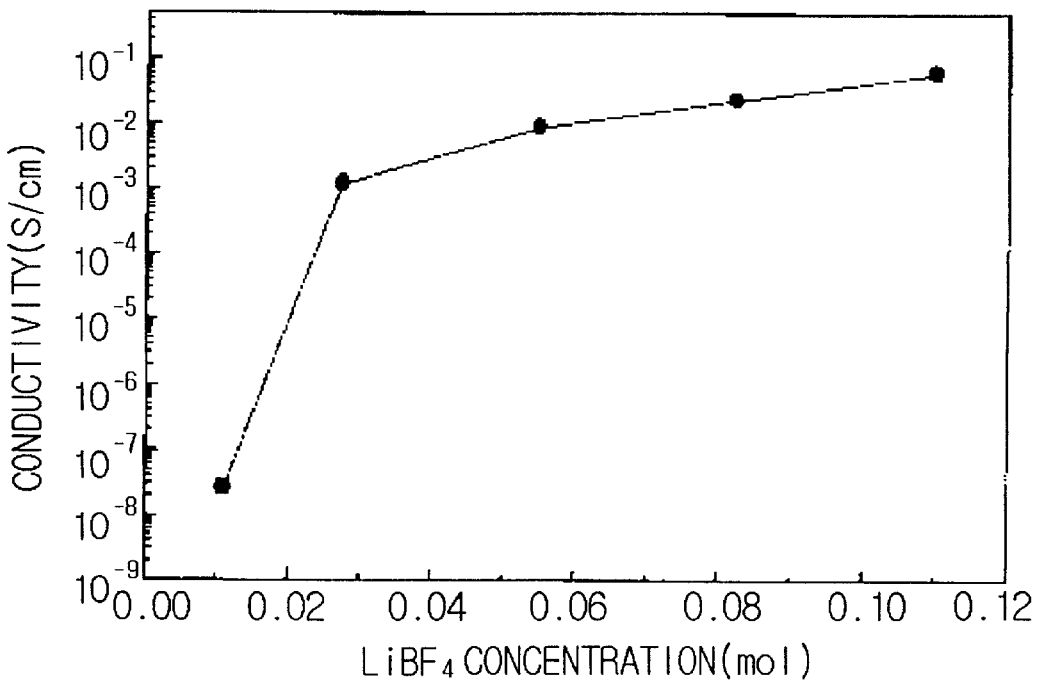
FIG. 3 is a graph showing the electric conductivity of polymer films formed from a solution dissolved with $LiBF_4$ and a polymer used in the embodiments of the present invention, as a function of the $LiBF_4$ concentration, wherein the electric conductivity is measured at room temperature.

FIG. 3 shows the electric conductivity of a polymer film formed from a solution containing both of $LiBF_4$ and a polymer, as a function of $LiBF_4$ concentration.

In this case, the D.C. conductivity is measured using a four terminal method at room temperature for films of 30 to 50 $\mu$m thick.

Although there are some differences in conductivity between the surfaces in contact with the substrate and those exposed when forming those films, it is confirmed that conducting polymer films can be obtained directly from the solution.

Furthermore, those polymer films exhibit large differences in conductivity as a function of the concentration of lithium salts used. However, when the concentration is over 0.3 mole, polymer films are difficult to be formed as self-sustaining ones and the increase of conductivity becomes meaningless.

Figure 4:
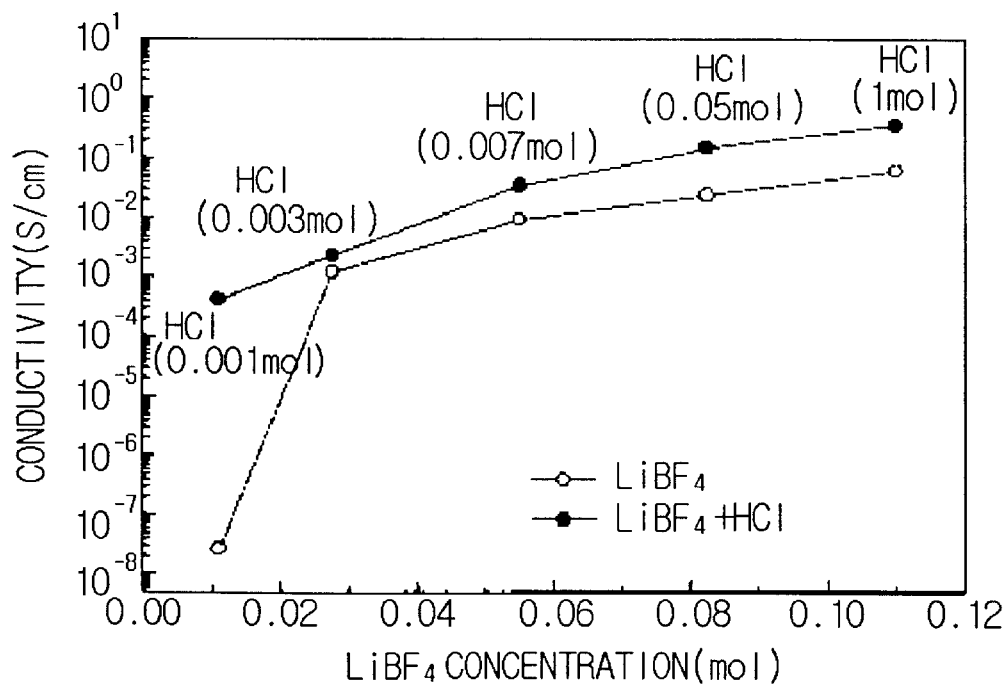
FIG. 4 is a graph showing electric conductivity of $LiBF_4$, and that of polymer films on which $LiBF_4$ and a protonic acid(HCl) used in the embodiments of the present invention are doped, as a function of the $LiBF_4$ concentration, wherein the electric conductivity is measured at room temperature.

FIG. 4 shows the conductivities of $LiBF_4$ and the polymer films doped by $LiBF_4$ and HCl, which are used in the embodiments of the present invention.

When the doped polymer films are doped again by the protonic acid (HCl) with the concentration equivalent to that of the lithium salt (dual doping), the electric conductivity is increased as shown in FIG. 4.

Figure 5:
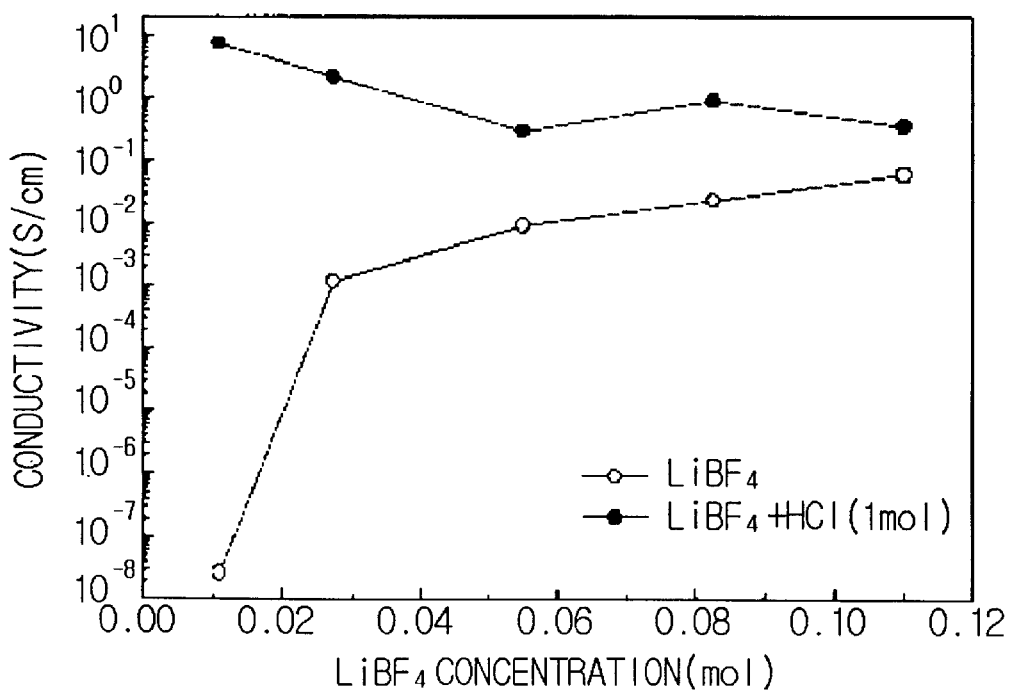
FIG. 5 is a graph showing electric conductivity of polymer films, as a function of the $LiBF_4$ concentration (1M HCl) at room temperature.

FIG. 5 shows the conductivities of polymer films doped by $LiBF_4$ and then doped by HCl with a constant concentration(1M). It can be seen that the conductivity can be further increased after HCl doping.

Figure 6:
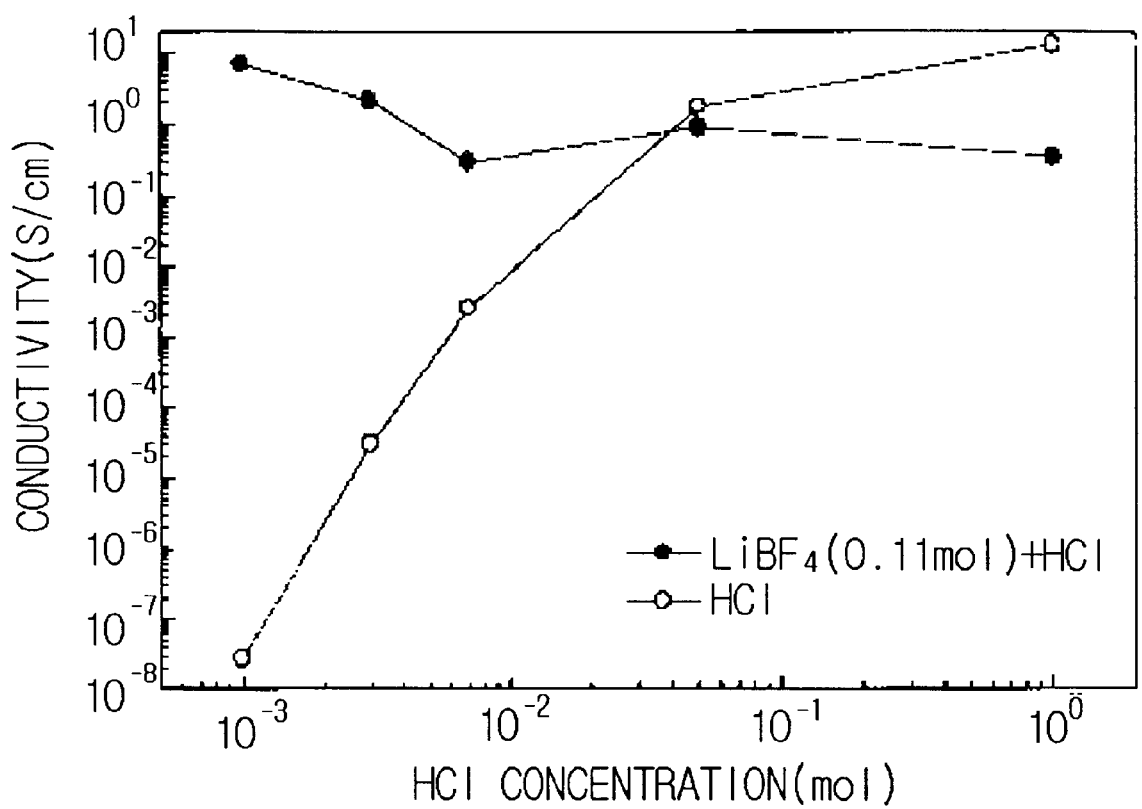
FIG. 6 is a graph showing electric conductivity of polymer films, as a function of the protonic acid (HCl) concentration (0.11 M $LiBF_4$) at room temperature.

FIG. 6 shows the conductivities of samples doped by HCl and $LiBF_4$, wherein the concentration of HCl is varied but with fixed concentration of $LiBF_4$, and doped by HCl only.

From FIG. 5, it can be seen that if the dual doping effect becomes greater with the decrease in the $LiBF_4$ concentration.

When the concentration of a lithium salt is too low, lithium salt doping is hardly occurred, similarly in general to the case of undoped polymer films treated with a protonic acid. Those films exhibit a conductivity of about 10 S/cm nearly consistent with that of the polymer films doped by HCl only, as shown in FIG. 6.

Comparing dual doping effects based on the above results, it is assumed that if lithium salt doping is first occurred, lithium ions occupy locations to be doped and the protonic acid doping is not easily occurred, whereas if lithium-salt doped locations are of small number, many locations to be doped are left.

It is also assumed that if some locations to be doped are left after lithium salt doping has been occurred, the protonic acid doping by dual doping would be occurred again, whereby conductivity is increased.

The films doped with 0.1M lithium salt are somewhat less conductive than undoped films. However, since the films manufactured according to the embodiments of the present invention have an advantage that they not only contain a lithium salt but also are formed directly from a solution, so their high utility is expected.

Figure 7:
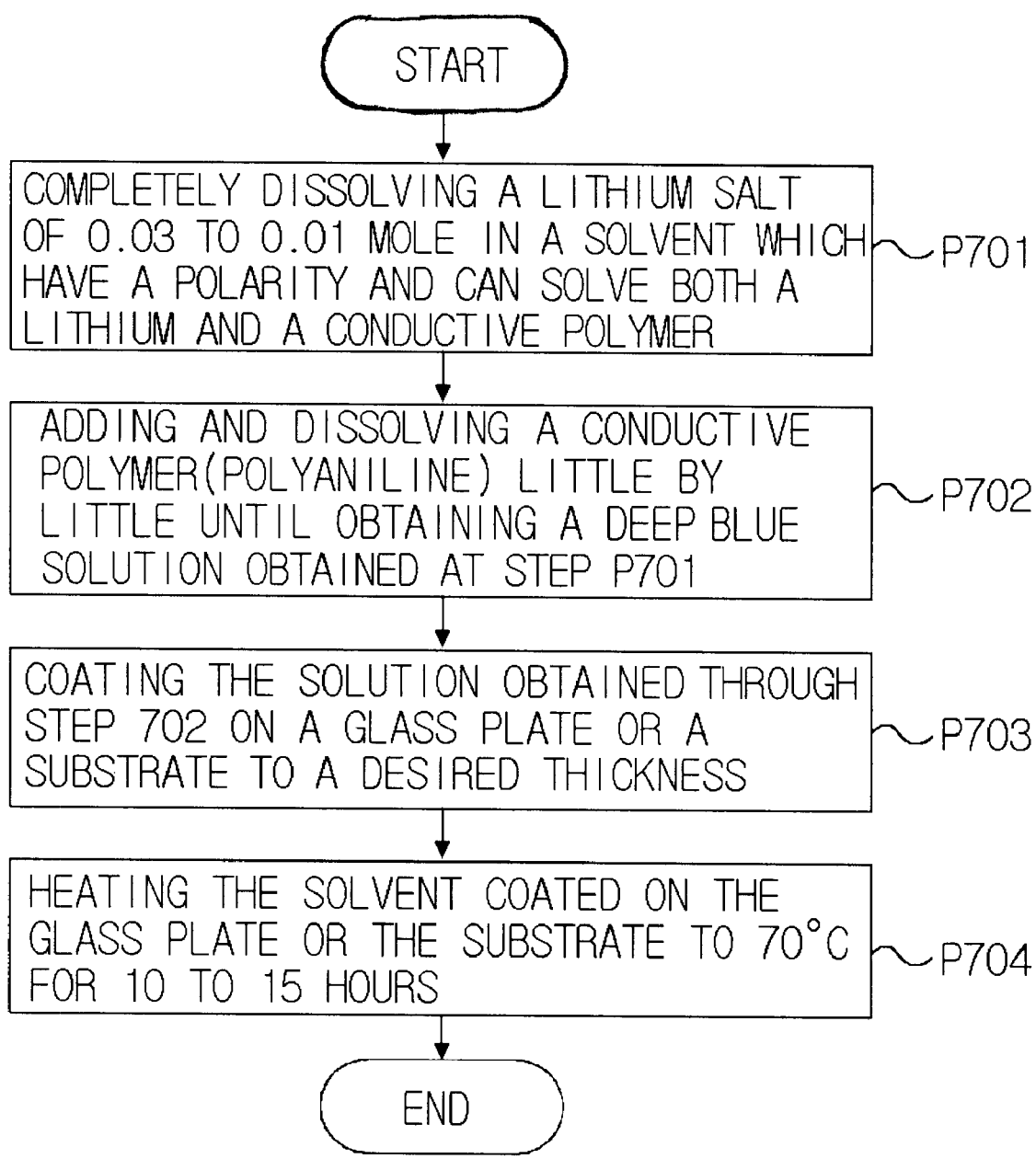
FIG. 7 is a flow chart showing a sequence of manufacturing an electric conducting polymer film having different conductivities at opposite surfaces thereof, formed directly from a polymer solution according to another embodiment of the present invention.

FIG. 7 is a flowchart showing a sequence for manufacturing the polymer film having different conductivities at its opposite surfaces, directly from a solution.

In order to obtain a polymer film having different conductivities at its opposite surfaces, a predetermined quantity of the solution formed through the step P102 in FIG. 1 (step P702) is directly poured onto a glass plate or a substrate to form a coating with a desired thickness (step P703) without passing through step P103, and then continuously heated under the elevated temperature (70° C.) for about 10 to 15 hours (step P704).

When a polymer film is manufactured in this way, its internal surface in contact with the substrate exhibits blue color which is the same as that of a protonic acid doped film and shows the a conductivity of about $10^{-1}$ to $10^{-2}$ S/cm.

In contrast to this, the outer surface exposed in air exhibits deep violet and has the conductivity of about $10^{-5}$ to $10^9$ S/cm.

The conductivity value changes depending on the concentration of the lithium salt used and the heating period of time.

NMP is a solvent with weak polarity and is basic due to the nitrogen atoms present within its molecular structure. And, if lithium salts are dissolved and positive and negative ions are dissociated in this solvent, these ions will be surrounded with NMP molecules (solvation). In other words, doping is not yet occurred. Therefore, color does not change.

However, if the solution is poured onto a glass plate and then heated, NMP will be evaporated, so that the number of positive and negative ions surrounded with NMP will be relatively decreased and, so that ions not surrounded with NMP will be increased and migrate toward the bottom side (toward the glass plate).

By these positive ions($Li^+$) not surrounded with NMP, doping caused by nucleophlic addition reaction will be occurred in nitrogen positions within polyaniline molecules.

As a result, doping occurs in the film formed, so that a conducting polymer can be formed from a solution.

Although representative embodiments of the present invention have been disclosed for illustrative purposes, those who are skilled in the art will appreciate that various modifications, additions and substitutions are possible without departing from the scope and spirit of the present invention as defined in the accompanying claims and the equivalents thereof.

What we claim:

1. A method for manufacturing a conducting polymer film having different conductivities at its opposite surfaces, comprising:

dissolving a lithium salt of 0.01 to 0.3 mole in an organic solvent;

dissolving a conducting polymer in the organic solvent to obtain a blue colored solution and allowing the solution to stand for more than seven days; and coating the obtained blue colored solution on a flat plate and heating the flat plate at about 70° C. for about 10 to 15 hours, thereby obtaining a conducting polymer film having different conductivities at its opposite surfaces.

2. The method according to claim 1, wherein the surface of the conducting polymer film in contact with the flat plate is more conductive than the other surface exposed in the air.

3. The method according to claim 1, wherein the organic solvent consists of polarized material which can dissolve both the lithium salt and the conducting polymer.

4. The method according to claim 3, wherein the organic solvent consists of N-methyl-pyrrolidinone (NMP).

5. The method according to claim 4, wherein the lithium salt is selected from the group consisting of $LiClO_4$, $LiPF_6$, $LiBF_6$, $LiAsF_6$, $LiCF_3SO_3$ $LiN(CF_3SO_2)_2$, $LiC(CF_3SO_2)_3$ and a combination thereof.

6. The method according to claim 1, wherein the lithium salt is completely dissolved by stirring the lithium salt using a magnetic stirrer within a drying box.

7. The method according to claim 1, wherein the conducting polymer is selected from the group consisting of polyaniline, polypyrrole, polythiophene, derivatives of these polymers, and a combination thereof.

8. The method according to claim 4, wherein dissolving a conducting polymer comprises adding and dissolving the conducting polymer in the range of 1 to 10 wt % (mass percentage of conducting polymer/NMP), and stirring it using a magnetic stirrer.

9. The method according to claim 8, wherein the conducting polymer is about 3 wt %.

10. The method according to claim 1, further comprising filtering the blue colored solution obtained in the step of dissolving a conducting polymer using a filter paper to remove residual polymer particles before coating the blue colored solution.

* * * * *